(12) United States Patent
Williams et al.

(10) Patent No.: US 7,350,963 B2
(45) Date of Patent: Apr. 1, 2008

(54) BLENDER JAR

(75) Inventors: Brian Paul Williams, Midlothian, VA (US); Benjamin Henry Branson, III, Mechanicsville, VA (US); John Robert Bohannon, Jr., Goode, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 11/052,338

(22) Filed: Feb. 4, 2005

(65) Prior Publication Data

US 2006/0176768 A1 Aug. 10, 2006

(51) Int. Cl.
*A47J 43/046* (2006.01)

(52) U.S. Cl. .................. 366/205; 366/306; 366/307; 366/314

(58) Field of Classification Search ........ 366/205–206, 366/314, 306–307; 241/282.1, 282.2; 99/348
See application file for complete search history.

(56) References Cited

U.S. PATENT DOCUMENTS

| | | | |
|---|---|---|---|
| 718,319 A * | 1/1903 | Cunningham | 366/164.4 |
| 1,262,289 A | 4/1918 | Weber | |
| 1,322,492 A | 11/1919 | Laing | |
| 1,580,778 A | 4/1926 | Coverstone | |
| D104,289 S * | 4/1937 | Osius | D7/378 |
| 2,109,501 A * | 3/1938 | Osius | 241/282.2 |
| 2,159,856 A | 5/1939 | MacLean | |
| 2,352,205 A | 6/1944 | Karlson | |
| D153,232 S * | 3/1949 | Newell | D7/413 |
| D166,268 S | 3/1952 | Morgan | |
| 2,702,571 A | 2/1955 | Murray | |
| D178,593 S | 8/1956 | Cerveny et al. | |
| 2,774,576 A * | 12/1956 | Frank, Sr. | 366/205 |
| 2,798,701 A * | 7/1957 | Collura | 366/205 |
| 2,924,349 A * | 2/1960 | Huck | 215/382 |
| 2,940,738 A * | 6/1960 | Posener et al. | 366/205 |
| 3,064,949 A * | 11/1962 | Dewenter | 241/195 |
| 3,172,441 A | 3/1965 | Hartwig et al. | |
| 3,175,594 A * | 3/1965 | Jepson et al. | 241/199.12 |
| 3,216,473 A * | 11/1965 | Dewenter | 241/167 |
| 3,240,246 A * | 3/1966 | Dewenter | 241/98 |
| 3,265,368 A | 8/1966 | Nocera | |

(Continued)

FOREIGN PATENT DOCUMENTS

GB 2398733 A * 9/2004

(Continued)

OTHER PUBLICATIONS

Photograph of Nutone Jar (by Scovill).

(Continued)

*Primary Examiner*—Charles E. Cooley
(74) *Attorney, Agent, or Firm*—Thomas & Karing, P.C.

(57) ABSTRACT

A blender jar defines a geometry to impart vertical movement to material being processed in the blender jar, and, alternatively or in combination, improves the horizontal movement to the blended material. By configuring one or more agitators on the floor of a jar, laminar flow or symmetric flow of material around the jar is disrupted. The material is forced in an upward direction in the jar and, therefore, into more frequent contact with the cutter blades rotating in the jar.

18 Claims, 14 Drawing Sheets

U.S. PATENT DOCUMENTS

| | | | |
|---|---|---|---|
| 3,315,945 A | 4/1967 | Nissman | |
| D208,749 S | 9/1967 | Slotnik | |
| 3,570,819 A | 3/1971 | Rosinger | |
| 3,612,126 A * | 10/1971 | Emmons et al. | 241/199.12 |
| 3,627,008 A * | 12/1971 | Samuelian | 241/199.12 |
| 3,706,443 A | 12/1972 | Oberhauser | |
| 3,843,521 A | 10/1974 | Zeff | |
| 3,871,523 A | 3/1975 | Boenisch | |
| D234,741 S | 4/1975 | Emmons | |
| 3,901,484 A * | 8/1975 | Ernster | 241/282.2 |
| 4,005,854 A | 2/1977 | Patton | |
| 4,087,053 A * | 5/1978 | Voglesonger | 241/282.1 |
| 4,199,268 A | 4/1980 | Parzych | |
| 4,201,487 A * | 5/1980 | Backhaus | 366/304 |
| 4,301,717 A | 11/1981 | Knees | |
| 4,382,685 A | 5/1983 | Pearson | |
| D277,634 S | 2/1985 | Doggett | |
| 4,534,657 A | 8/1985 | Clement | |
| 4,911,556 A | 3/1990 | Lim et al. | |
| 4,911,557 A * | 3/1990 | Dormer et al. | 366/299 |
| 5,075,234 A | 12/1991 | Tunac | |
| D327,812 S | 7/1992 | Thomas et al. | |
| 5,292,193 A | 3/1994 | Funk | |
| 5,323,973 A * | 6/1994 | Ferrara, Jr. | 241/37.5 |
| 5,330,267 A | 7/1994 | Tauscher | |
| 5,409,313 A | 4/1995 | Funk | |
| 5,549,854 A | 8/1996 | Hulthom et al. | |
| D373,504 S | 9/1996 | Leverrier | |
| 5,634,717 A | 6/1997 | Fraczek et al. | |
| D386,357 S | 11/1997 | Davidson | |
| D390,416 S | 2/1998 | Hippen et al. | |
| D396,996 S | 8/1998 | Lallemand | |
| 5,800,058 A | 9/1998 | Cook | |
| 6,007,237 A | 12/1999 | Latto | |
| 6,012,837 A | 1/2000 | Thuma | |
| 6,027,242 A | 2/2000 | Thuma | |
| D429,956 S * | 8/2000 | Bohannon et al. | D7/413 |
| 6,109,780 A | 8/2000 | Lesniak | |
| D435,192 S | 12/2000 | Bohannon, Jr. et al. | |
| D437,731 S | 2/2001 | Thackray | |
| 6,332,706 B1 | 12/2001 | Hall | |
| 6,527,433 B2 | 3/2003 | Daniels, Jr. | |
| 6,568,843 B1 | 5/2003 | Lai | |
| 6,604,850 B1 | 8/2003 | Schneider et al. | |
| D480,915 S | 10/2003 | Kolar et al. | |
| D483,994 S | 12/2003 | Boyle et al. | |
| D487,213 S | 3/2004 | Boyle et al. | |
| 6,854,876 B2 * | 2/2005 | Dickson, Jr. | 366/205 |
| 6,981,795 B2 * | 1/2006 | Nikkah | 366/199 |
| 7,267,478 B2 * | 9/2007 | Miller et al. | 366/205 |
| 7,281,842 B2 * | 10/2007 | Dickson, Jr. | 366/205 |
| 2002/0031046 A1 | 3/2002 | Schneider et al. | |
| 2002/0080678 A1 | 6/2002 | Daniels, Jr. | |
| 2003/0043688 A1 | 3/2003 | Peterson et al. | |
| 2003/0099154 A1 | 5/2003 | Daniels, Jr. | |
| 2003/0213373 A1 | 11/2003 | Dickson, Jr. | |
| 2003/0214875 A1 | 11/2003 | Dickson, Jr. | |
| 2004/0037162 A1 | 2/2004 | Flohr et al. | |
| 2004/0062140 A1 | 4/2004 | Cadogan et al. | |
| 2004/0159624 A1* | 8/2004 | Miller et al. | |
| 2005/0018534 A1* | 1/2005 | Nikkah | 366/205 |
| 2005/0122837 A1* | 6/2005 | Bravard et al. | 366/199 |
| 2007/0165484 A1* | 7/2007 | Branson et al. | 366/192 |

FOREIGN PATENT DOCUMENTS

| | | | |
|---|---|---|---|
| JP | 4-17820 | * | 1/1992 |
| JP | 9-37970 | * | 2/1997 |
| WO | WO 90/11126 | | 10/1990 |
| WO | 03/001954 A1 | * | 1/2003 |
| WO | WO 03/001954 | | 1/2003 |

OTHER PUBLICATIONS

International Search Report and Written Opinion mailed Aug. 8, 2006, International application No. PCT/US05/43619.

International Preliminary Report of Patentabilty and Written Opinion; International Application No. PCT/US/2005/043619; mailed Aug. 16, 2007.

* cited by examiner

BLENDER JAR

The present invention relates to a blender jar construction adapted to improve the blending performance of a blender. Specifically, the floor of the blender jar includes an agitator that imparts vertical movement to material that is being processed in the blender jar. Also, sidewall bumps are engineered relative to a blender blade path to improve performance.

BACKGROUND OF THE INVENTION

Blender performance is the subject of considerable engineering by blender manufacturers. Efforts to improve blend consistency and efficiency have been directed to areas including blender cutter speed, blender cutter shape, and blender jar sidewall geometry. While each is effective in improving performance in certain instances, these efforts also have their limitations.

Blender cutter speed and speed variation has often been used to improve blending processes by speeding up or making variable the cutting and blending action of the cutter assembly. However, if the blades move too fast, then the rapid rotation may cause cavitation. If a user must manually vary the speed of operation of the blender, then such manual work requires user attention during some or all of the blending process.

Blender cutter assemblies have also been engineered to help move material being processed as well as improve the processing of the material. The pitching of the blade may promote some vertical movement of material being processed. Angling of the blade will change the blade path. If blade shape (including pitch and angle) is too aggressive, however, then the design may put extra strain on the blender motor. If the blade shape is relatively flat, then it may be more prone to cavitation at high speeds of operation. In any event, the cutter assembly cannot alone be used to overcome dead zones that are created in the material in a jar as a result of the processing inside a particular jar geometry.

Jar sidewall geometry has also been used to try to improve blender performance. In the early 1980's, for instance, a Nutone® blender (manufactured by Scovill) included a generally triangular-shaped jar. Two of the walls of the Nutone blender jar included bumps. The third wall had no bump. Further, the triangular cross-section of the blender was not symmetrical as the third wall was longer than the first two walls. The cutter assembly was set closer to the third wall (no bump) than the other two walls. In operation, presumably as a result of the asymmetric sidewall geometry, the blender formed a vortex in the material being processed with the vortex centered away from the axis defined by the shaft carrying the cutter. This movement of the vortex is expected to help the efficiency of that blender.

Another recent attempt to improve blender operation through sidewall modification is described in published U.S. Patent Application No. US2003/0213373 owned by K-Tec. As with the Nutone blender, this blender manufactured by K-Tec claims to improve the performance of the blender by making the sidewalls asymmetrically configured around the central axis of the cutter assembly. In the K-Tec blender, a fifth wall is truncated so that it is closer to the blade path of the cutter assembly. As explained in that patent application, this geometry moves the vortex of blended material in the blender away from the central axis and therefore improves performance of the blender.

As seen in both the Nutone and K-Tec blender jar configurations, the manipulation of sidewall geometry to an asymmetric configuration affects the horizontal flow of material within the blender jar. However, the sidewall geometry only primarily affects the horizontal flow of material. That is, the movement of material in the cross-sectional planes perpendicular to the vertical axis of the blender jar is affected. Therefore, the sidewall geometry is limited to essentially affecting only two dimensional change in material flow, i.e., in a single plane.

SUMMARY OF THE INVENTION

Accordingly, it is an object of the present invention to improve blender jar geometry to promote three dimensional material flow. The jar would include a floor having an agitator. Alternatively, or in combination with an agitator, specific sidewall bumps may be used to improve the horizontal flow of material within a blender jar.

In one example, a blender jar for promoting three dimensional material flow comprises a floor and a sidewall connected to the floor and extending vertically upwardly from the floor to form a space inside the sidewall and above the floor where material is blended. The floor comprises an opening through which extends a drive shaft. A cutter assembly is attached to the drive shaft, the cutter assembly comprising a blade that rotates on the shaft inside the blender jar and above the floor, the rotation of the blade defining a blade path. The floor comprises an agitator that is closer to the blade path than the remainder of the floor, whereby material that is being processed in the jar has vertical motion imparted to it caused by contact with the agitator. The floor may comprise a plurality of agitators, and the agitators may be symmetrically spaced around the circumference of the opening in the floor. The agitators may be asymmetrically spaced around the circumference of the opening in the floor. The sidewalls may comprise a rib or a plurality of ribs. The sidewall may comprise a bump or a plurality of bumps. The plurality of agitators may comprise a plurality of sizes.

In another example, a blender jar for promoting three dimensional material flow comprises a floor and a sidewall connected to the floor and extending vertically upwardly from the floor to form a space inside the sidewall and above the floor where material is blended. The floor comprises an opening through which extends a drive shaft. A cutter assembly is attached to the drive shaft, the cutter assembly comprising a blade that rotates on the shaft inside the blender jar and above the floor, the rotation of the blade defining a blade path. The sidewall comprises a substantially circular cross section, and it further comprises a vertical bump therein. The size of the bump is defined as the distance that surface of the bump is indented from the imaginary circular radius of the sidewall. The minimum distance from the widest point of the blade path to the bump is about 25% to 55% of the size of the bump. In a further example, the minimum distance from the widest point of the blade path to the bump is about 30% to 45% of the size of the bump. The sidewall may further comprise a plurality of vertical bumps therein, and the plurality of vertical bumps may all have the same size of bump. The floor may further comprise an agitator that is closer to the blade path than the remainder of the floor.

DETAILED DESCRIPTION

Figure 1:
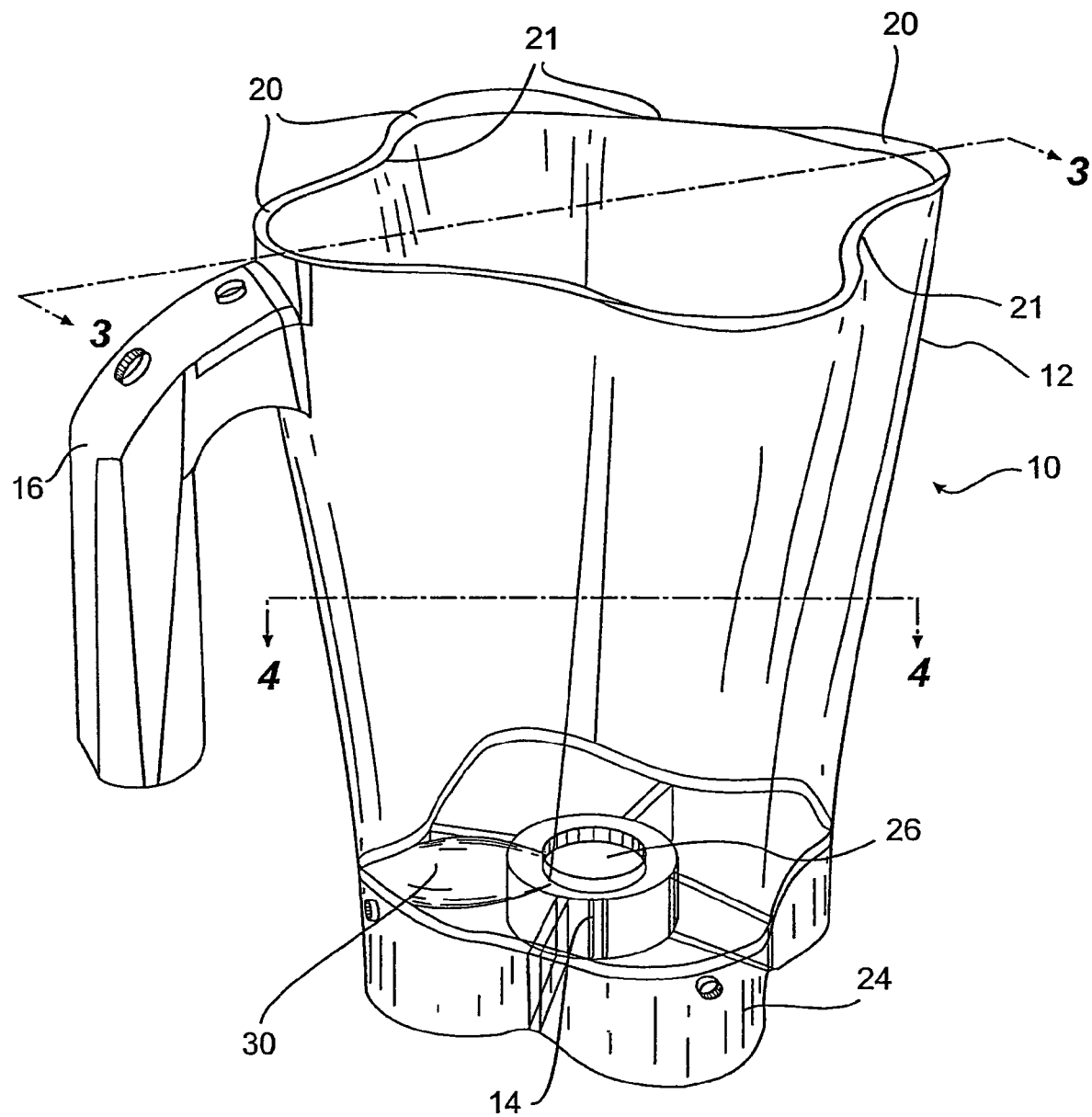
FIG. 1 is a perspective view of a blender jar in accordance with one example of the present invention.
Figure 2:
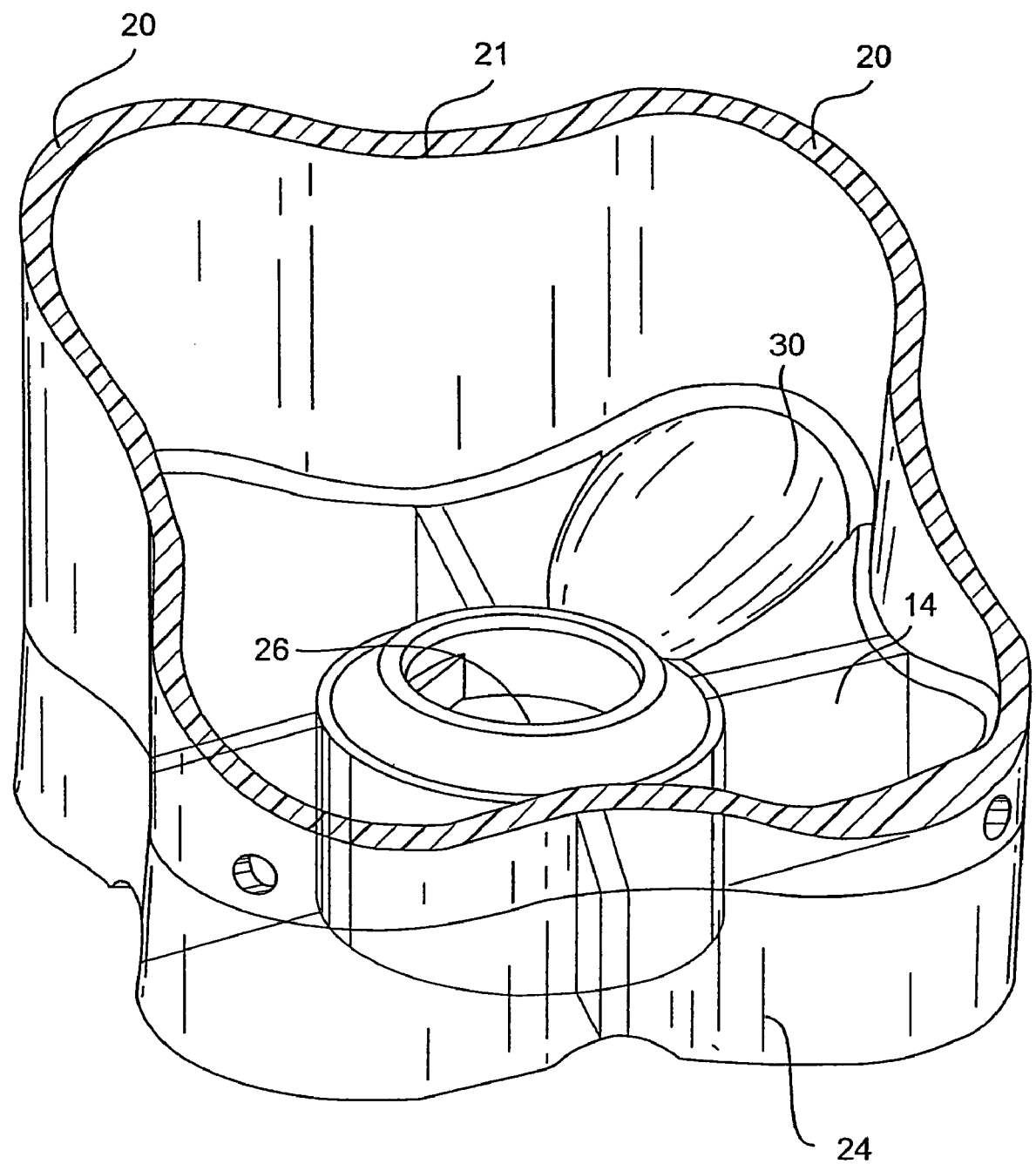
FIG. 2 is a cut away, perspective view showing the floor of the blender jar shown in FIG. 1.

The present invention is directed to a modification of blender jar geometry to impart vertical movement to material being processed in the blender jar, and, alternatively or in combination, to improve horizontal motion to the material. By configuring one or more agitators on the floor of the jar, laminar flow or symmetric flow of material around the jar is disrupted. The material is forced in an upward direction in the jar and, therefore, into more frequent contact with the cutter blades rotating in the jar.

A blender jar, in the most simple terms, includes a floor and a sidewall connected to the floor. The sidewall extends upwardly from the floor to form a space inside the sidewall and above the floor where material may be blended. The floor is the portion of the blender jar generally under the plane that includes the blades of the cutter assembly when mounted in the jar and the path of those blades during operation. The floor may be flat, angled, curved, or a combination thereof. The floor is typically described by "revolve" geometry that promotes a laminar flow of material in the circumferential direction. The floor includes an opening, typically in the center of the floor, through which a drive shaft extends. The cutter assembly is then mounted onto that drive shaft.

The sidewall of a jar may have a horizontal cross-sectional shape of round, square, triangular, oval, or geometric shapes both symmetric or asymmetric or combinations thereof. The sidewall may include ribs that are solid protrusions into the inside space of the jar. The sidewall may further define vertical bumps, that are, in general terms, more significant in size than a rib. The bumps are inward protrusions of various geometries. The bumps may be symmetric or asymmetrically configured around the circumference of the jar. The ribs and bumps are used to impart turbulence with respect to the flow of material in the horizontal planes that are the cross-sections of the blender jar and that are parallel to the planes of the blade path defined by the rotation of the cutter assembly. The bumps are further used to direct the flow of material back into the path of the blades to ensure that the mix is recirculated through the blades for more complete blending. The bottom of a sidewall interacts with or fits into a blender base during operation.

The blades in a blender jar make up the working component of the cutter assembly. The blades are connected to a shaft that is in turn connected to a clutch. The shaft extends through the opening in the floor of the jar. The clutch is underneath the floor of the jar and mates with a reciprocal clutch on the blender base to drive the rotation of the cutter assembly. In operation, the blade or blades rotate around in a horizontal plane inside the jar. This rotation of blades defines a blade path. The thickness of the blade path depends of the size, pitch and angling of the blades. For instance, if a flat blade is used, then there is a relatively narrow blade path. Alternatively, if a highly pitched blade is used, then a relatively wider blade path is defined.

The rotation of the blades of the cutter assembly inherently forces material in the horizontal, circumferential direction of the rotation of those blades. It must also be recognized that the pitch of the blades may also impart other directional forces on the material being processed, but that flow is still primarily around the circumference of the inside of the jar.

An agitator is configured into the floor of a blender jar to take advantage of the circumferential flow of material caused by the blades. The agitator imparts a vertical direction component into the otherwise substantially laminar flow of material in the horizontal plane around the circumference of the jar. An agitator is a raised surface in the floor of a blender jar that disrupts or breaks laminar flow of material in the circumferential direction. Stated conversely, the agitator geometry is contrary to a "revolve" geometry that promotes a circumferential, laminar flow of material. The agitator is a portion of the surface of the floor that is closer to the surface of the blade path than the remainder of the floor. As such, the agitator will force the otherwise circumferential and laminar flow into an upward direction. The result is that the jar geometry promotes an upward vector of material flow and gives better performance.

An agitator may be one surface or multiple different surfaces of a blender container floor. In other words, there may be two or more agitators spaced around the circumference of the jar. In the case of two or more agitators, they may be spaced symmetrically or asymmetrically around the circumference of the floor. The relative height of the agitator, in relation to the blade path, may be the same or different when there are multiple agitators. The specific shape of an agitator may be hemispheric, sinusoidal, planar, curved, or other geometric configurations and combinations thereof. These agitator geometries may be generally parallel to the blade path plane. Alternatively, they may be angled or curved to the plane of the blade path. The final configuration of an agitator may be varied by the engineering requirements in specific cases based on the overall geometry of a given jar.

The following examples are directed to alternative blender jar geometries that benefit from the addition of an agitator in the respective floors. Of course, other alternatives will be known to those of skill in the art given the benefit of the teachings herein.

EXAMPLE 1

FIGS. 1-4

FIGS. 1-4 illustrate a substantially four-sided blender jar 10. The jar 10 has four sides 12 that make up the sidewall of the jar. The jar 10 has rounded vertical corners 20 and vertical bumps 21 along the vertical length of the jar. The floor 14 of the jar 10 is generally smooth and primarily embodies a revolve geometry to promote laminar flow in the circumferential direction on the floor during operation. The jar 10 includes a handle 16. The bottom portion 24 of the sidewalls 12 is adapted to be received in a blender base to secure the jar while the blender motor is operated to rotate a cutter assembly. The floor 14 also includes a central opening or aperture 26 through which extends a drive shaft 35. The drive shaft 35 has a cutter assembly 36 mounted onto it.

The floor 14 also includes an agitator in the form of a horizontal hump 30. The hump 30 is substantially the length of the radius of the jar from the central opening 26 to the sidewall 12. The height of the hump 30, in one example, is about 0.170" greater than the remaining portion of the floor 14 around the circumference of the opening 26. In other words, the top of the hump 30 is closer to the blade path defined by the blades 36 than the rest of the floor 14. As demonstrated specifically in FIG. 3, the length L1 from the top of the hump 30 to the bottom of the blade 36 is less than the length L2 from the top of the floor 14 to the blade 36. In this example, L1 is about 0.310" and L2 is about 0.490" for the difference in distance of about 0.180". The range of difference in the distance between the top of an agitator to a blade path versus the distance from a floor to a blade path can be about 0.100" to 0.450". Of course, this range of difference may vary further depending on specific blender jar designs.

In testing, blender jars were compared for performance both with and without the agitator hump 30 on the floor 14 of the jar.

Testing was conducting by using the current Hamilton Beach Commercial "Tempest" 32 oz. container. One standard container (having revolve geometry in its floor) had new blades installed into it and another container had these same blades installed along with an agitator in the floor. The agitator had the single hump and geometry as shown in FIGS. 1-4. The tests were run on similar 91650 base units set at 76% power (13,300 RPM) for a period of 12 seconds. A double Margarita mix was run in the unit. After blending, the mix was run through a sieve with holes sized at 0.07". The remaining mix was weighed on a scale. The testing results are below:

|  | Std. Container | Container w/ Agitator |
|---|---|---|
|  | 6.512 | 5.136 |
|  | 7.6 | 6.134 |
|  | 6.14 | 5.472 |
|  | 6.271 | 5.531 |
|  | 6.817 | 5.962 |
| avg. | 6.668 | 5.647 |

From the data, it can be seen that more of the mix from the container with the agitator went through the sieve. This means that the particles were broken down to a smaller size as a result of more efficient blending.

EXAMPLE 2

FIGS. 5-8

Another example of a blender jar is shown in FIGS. 5-8. The jar 50 has a fundamentally round sidewall cross-section with two vertical bumps 53 on one side of the circular cross section. The floor 56 is curved in substantial part in a revolve geometry. There is a handle 54. The bottom portion 58 of the sidewall 52 engages a blender base via the outside geometry of the jar (at the bumps) and a series of ribs and/or slots on the base of the jar to hold the jar secure during operation.

The floor 56 includes multiple agitators, specifically, three surfaces 57 and 59 that disrupt laminar flow around the jar 50 in the circumferential direction. In this example, the pair of surfaces 57 are generally similar to each other. The surface 59 is similar in function the surfaces 57, but the surface 59 has slightly different geometry in that it is configured between the two bumps 53 and the sidewall 52. The surfaces 57 and 59 are substantially flat planes that are closer to the blades 60 and the blade path formed by the rotation of the blades than the laminar, revolve geometry of the floor 56 generally. These surfaces 57 and 59 create turbulence in the vertical direction of the flow of material that may be blended within the jar 50. In this example of a jar 50, it can be seen that the agitator surfaces 57 and 59 in the floor 56 work with the vertical bumps 53 in the sidewall of the jar to create turbulence in both the horizontal and vertical directions of flow of material within the jar.

In this example, the distance from surfaces 57 to the blade path is about 0.13", from surface 59 to the blade path is about 0.13", and from the floor 56 to the blade path is about 0.36".

In testing it was discovered that the jars with the floor agitators and sidewall bumps had superior performance results over a blender jar having a conventional, revolve geometry.

Initial tests were conducted using a container with a single bump added to the sidewall and a container from the current Hamilton Beach Commercial 908 blender that has a mostly round cross section. This single bump unit included a bump having generally the same dimensions as either one of the bumps shown in FIGS. 5-8. The tests consisted of blending specified recipes and determining if the mix was blended completely in the prescribed amount of time (i.e. number of ice chunks) as well as measuring the yield and calculating the deviation from the desired yield. On average, the container with the single bump was determined to be superior to the mostly round container in both categories as is indicated in the data below for a single batch margarita.

| Trial | Sample | Number of Ice Particles | Size of Ice Particles (in.) | Yield (mL) | Yield (oz.) | Desired Yield (oz.) | Deviation from Desired Yield (%) |
|---|---|---|---|---|---|---|---|
| 1 | Single Bump | 0 | N/A | 410 | 13.86 | 14.00 | 0.01 |
| 2 | Single Bump | 0 | N/A | 400 | 13.53 | 14.00 | 0.03 |
| 1 | 908 | 7 | 0.250 | 390 | 13.19 | 14.00 | 0.06 |
| 2 | 908 | 4 | 0.375 | 410 | 13.86 | 14.00 | 0.01 |

Further refinements to the design were then made and consisted of the addition of a second bump at 120° to the initial bump as well as floor agitators around the perimeter of the floor at 120° as shown in FIGS. 5-8. With the knowledge that the single bump was superior to the mostly round container, a qualitative analysis was then conducted to compare the container with the single bump to the refined design shown in FIGS. 5-8. The qualitative analysis consisted of blending batch sizes of 1, 2, and 3 drinks and having a random sampling of persons determine the preferred drink profile. On the average, the refined design shown in FIGS. 5-8 was determined to be superior to the single bump design as is indicated by the following data for the margarita recipe.

| Batch Size | Double Bump & Agitators | Single Bump |
|---|---|---|
| 1 | No Chunks - Preferred | No Chunks |
| 2 | No Chunks - Preferred | No Chunks |
| 3 | No Chunks - Equal | No Chunks |

EXAMPLE 3

FIGS. 9-12

A still further example of a blender jar is shown in FIGS. 9-12. Like the jar 50 shown in Example 2, jar 70 has a fundamentally round sidewall cross-section with two vertical bumps 73 on one side of the circular cross section. The floor 76 is curved in substantial part in a revolved geometry. There is a handle 74. The bottom portion 78 of the jar 70 engages a blender base to hold the jar secure during operation.

The floor 76 includes multiple agitators, specifically, three surfaces 77 and 79 that disrupt laminar flow around the jar 70 the circumferential direction. In this example, the pair of surfaces 77 are generally similar to each other. The surface 79 is similar in function to the surfaces 77, but the surface 59 has slightly different geometry in that it is configured between the two bumps 73 and the sidewalls 72. The surfaces 77 and 79 are substantially flat planes that are closer to the blades 80 and the blade path formed by the rotation of the blades than the laminar, revolved geometry of the floor 76 generally. These surfaces 77 and 79 create turbulence in the vertical direction of the flow of material that may be blended within the jar 70. In this example of the jar 70, it can be seen that the agitator surfaces 77 and 79 and the floor 76 work with vertical bumps 73 in the sidewall of the jar to create turbulence in both the horizontal and vertical directions of flow of material within the jar.

In this example, the minimum distance from the surfaces 77 to the farthest extending point of the blade path is about 0.505" from surface 79 to the blade path is about 0.497", and from the floor 76 to the blade is about 0.751".

The primary differences between jar 50 (Example 2) and jar 70 (Example 3) involve engineering variances suited for the particular blender assemblies that would use the respective jars.

In testing it was discovered that the jars with the floor agitators had superior performance results over a blender jar having a conventional, revolve geometry.

Testing—Protocol

A standard "small-batch" recipe consisting of 10 ice cubes (from Rubbermaid® square ice cube trays), 4 fluid ounces of pineapple juice, 3 fluid ounces of coconut cream, and 1 fluid ounce of milk cream was blended on the highest speed of the test unit for 30 seconds. After the allotted time, the mixture was poured through a #4 sieve (³⁄₁₆" openings). The ice remaining in the jars was then weighed to achieve a quantitative analysis.

Testing—Results

The jar described herein in Example 3 and shown in FIGS. 9-12 was tested relative to blender jars having a basic revolve shape using the same blender motor and blade set. Over repeated tests, blending the aforementioned recipe, the revolve shape jars left "uncrushed ice" in the sieve ranging from 40-90 grams. The jar described herein left "uncrushed ice" in the sieve ranging from 0-10 grams.

The test was repeated using a "large-batch" recipe that is equal to exactly three times the amount of all ingredients. The blending time was held constant at 30 seconds. During repeated runs of this test, the revolved shape jars left "uncrushed ice" in the sieve ranging from 20-100 grams. The jar described herein left "uncrushed ice" in the sieve ranging from 0-4 grams.

Figure 3:
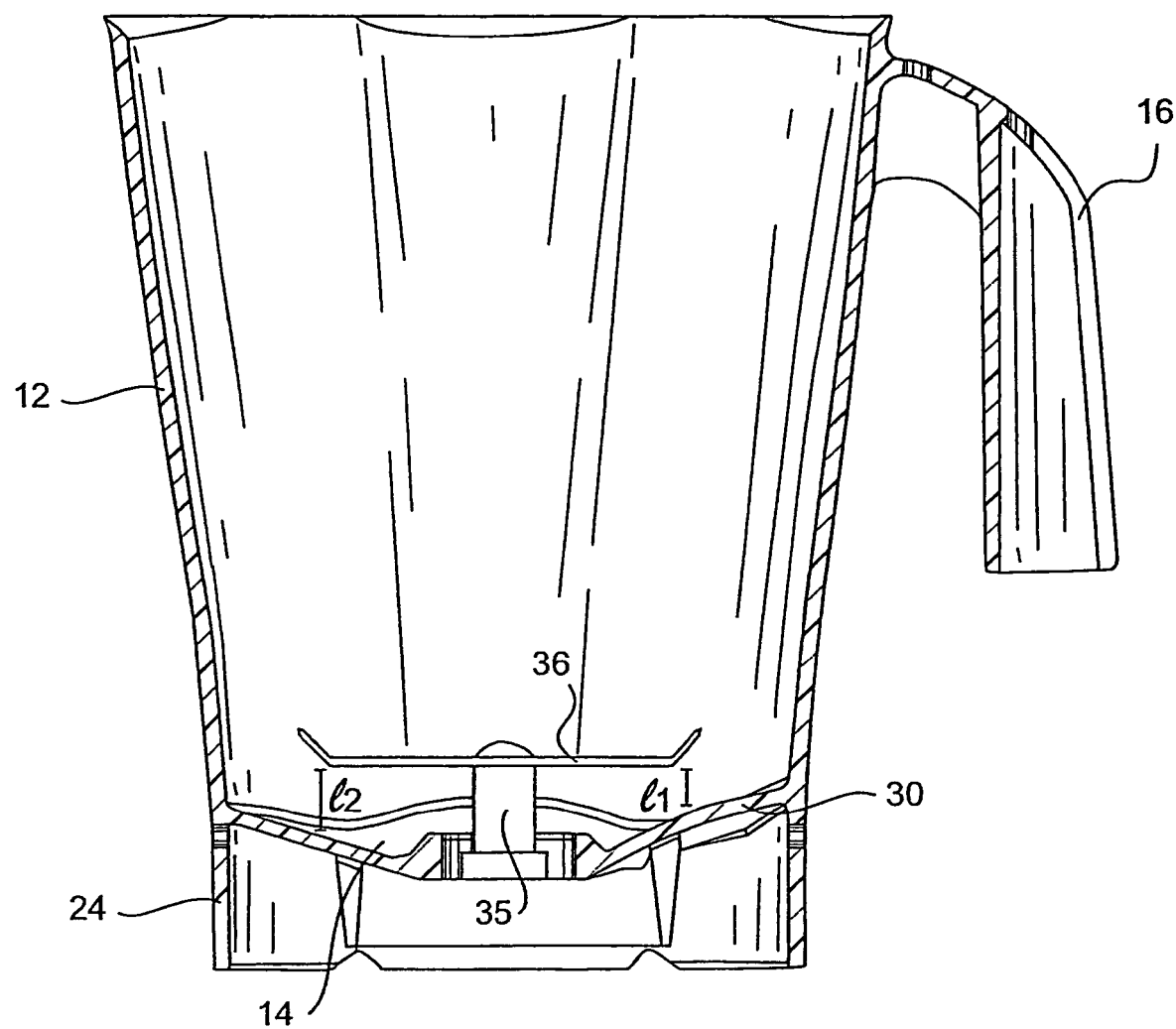
FIG. 3 is a cross sectional, side elevation view of the jar shown in FIG. 1 taken along line 3-3 of FIG. 1.
Figure 4:
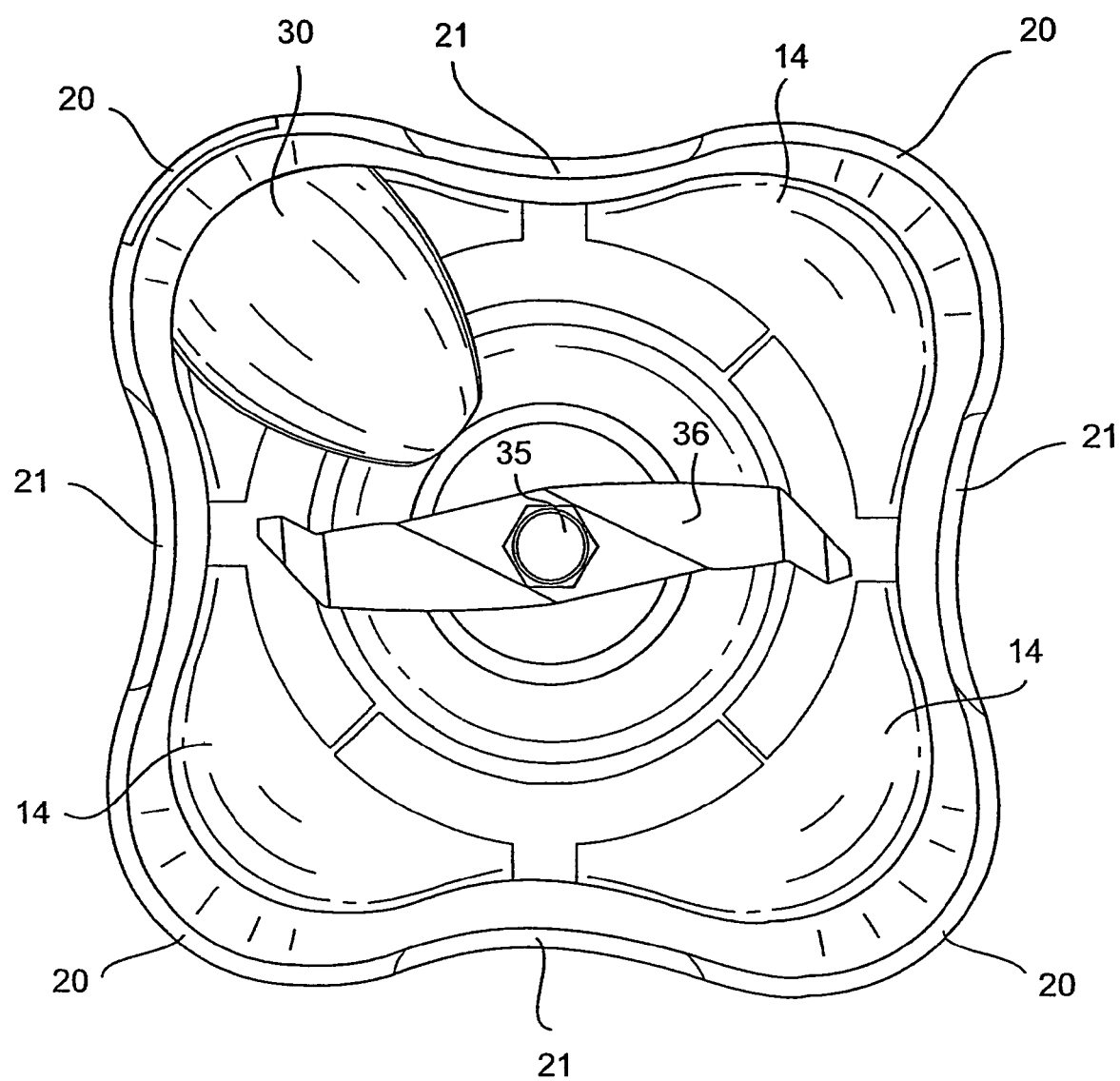
FIG. 4 is a top plan view of the blender jar shown in FIG. 1 taken along line of 4-4 of FIG. 1.
Figure 5:
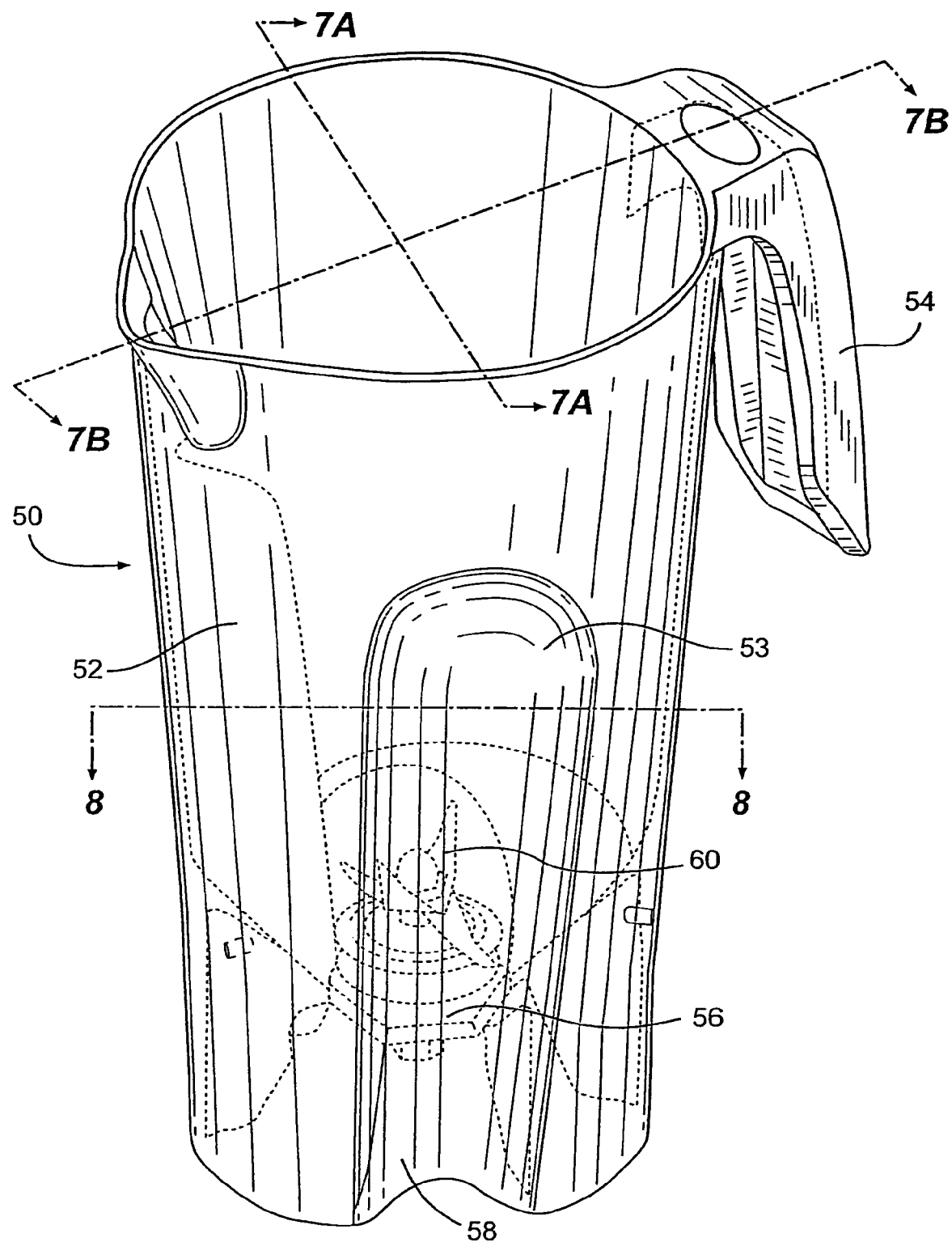
FIG. 5 is a perspective view of a blender jar in accordance with a second example of the present invention.
Figure 6:
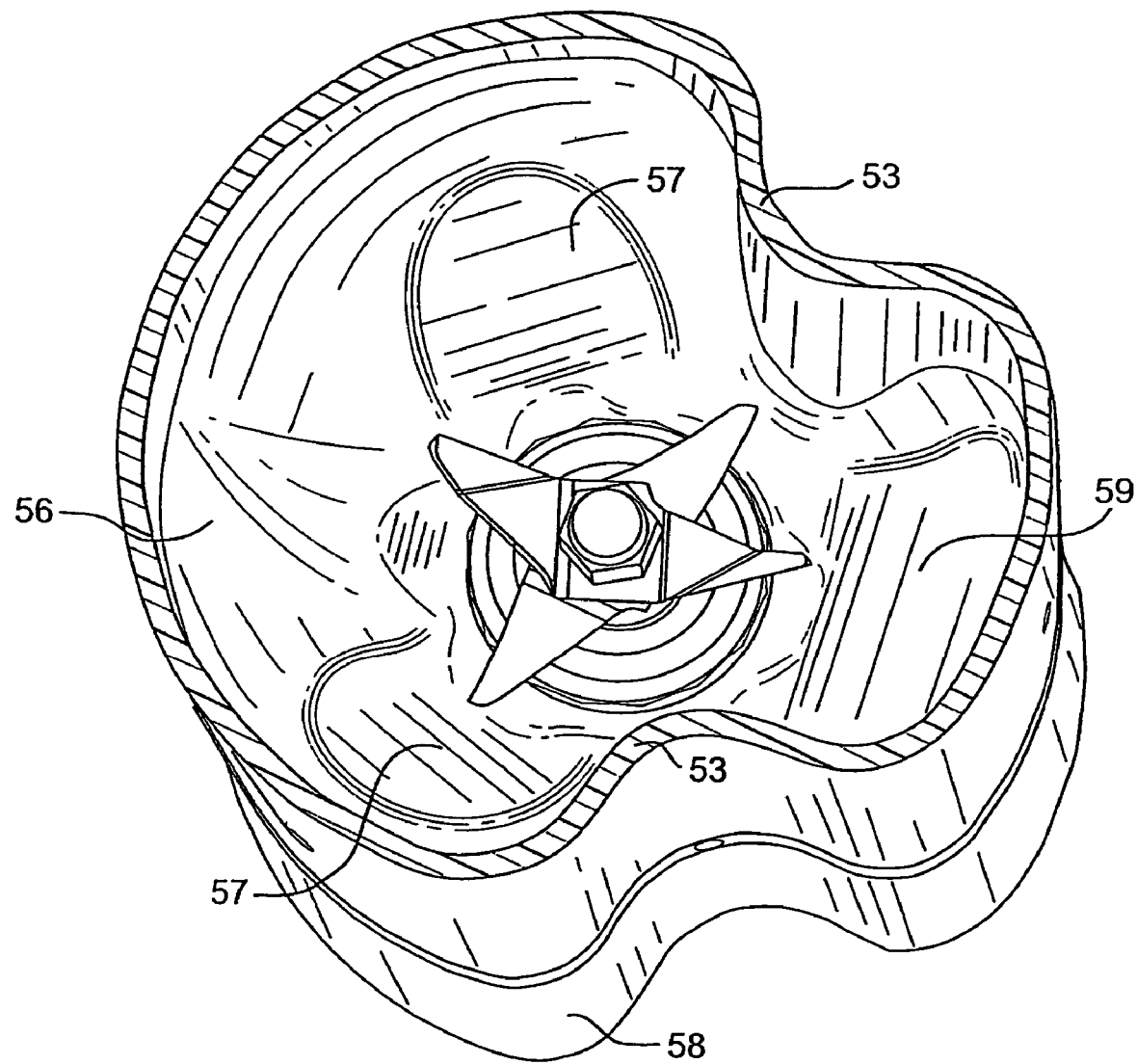
FIG. 6 is a cut away, perspective view of the floor of the blender jar shown in FIG. 5.
Figure 7A:
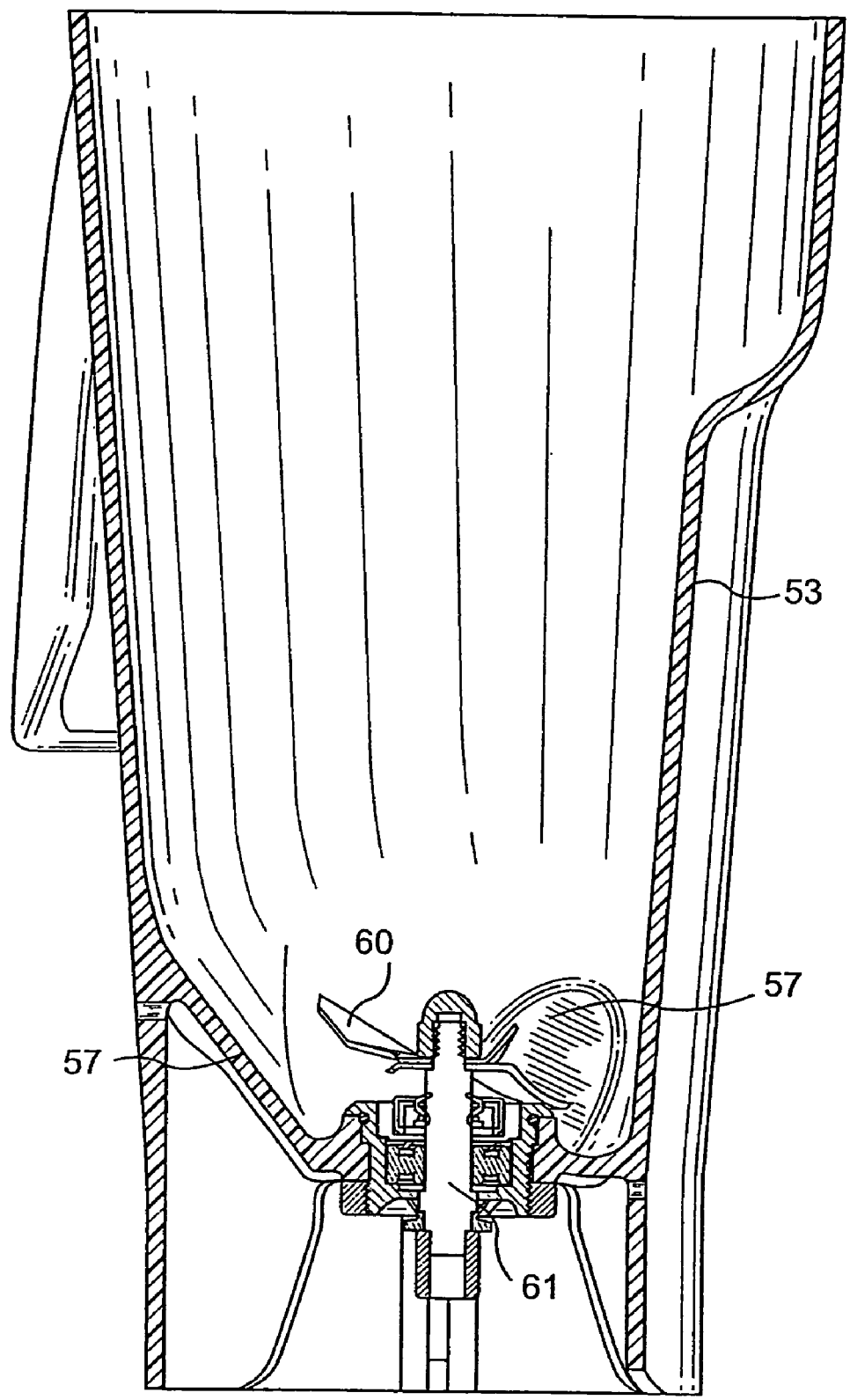
FIGS. 7a and 7b are cross sectional, side elevation views of the blender jar shown in FIG. 5 taken along lines 7a and 7b perspectively.
Figure 7B:
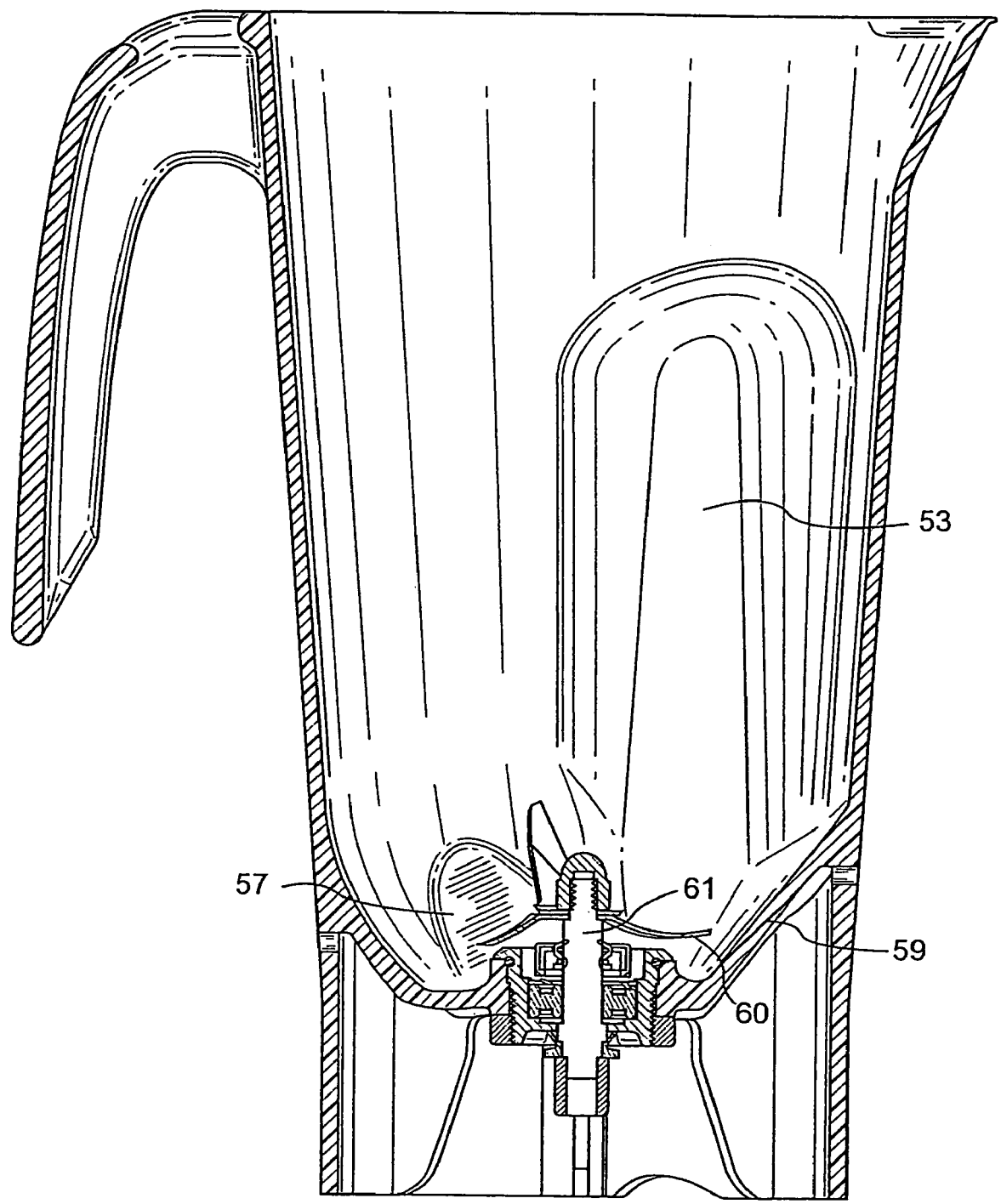
Figure 8:
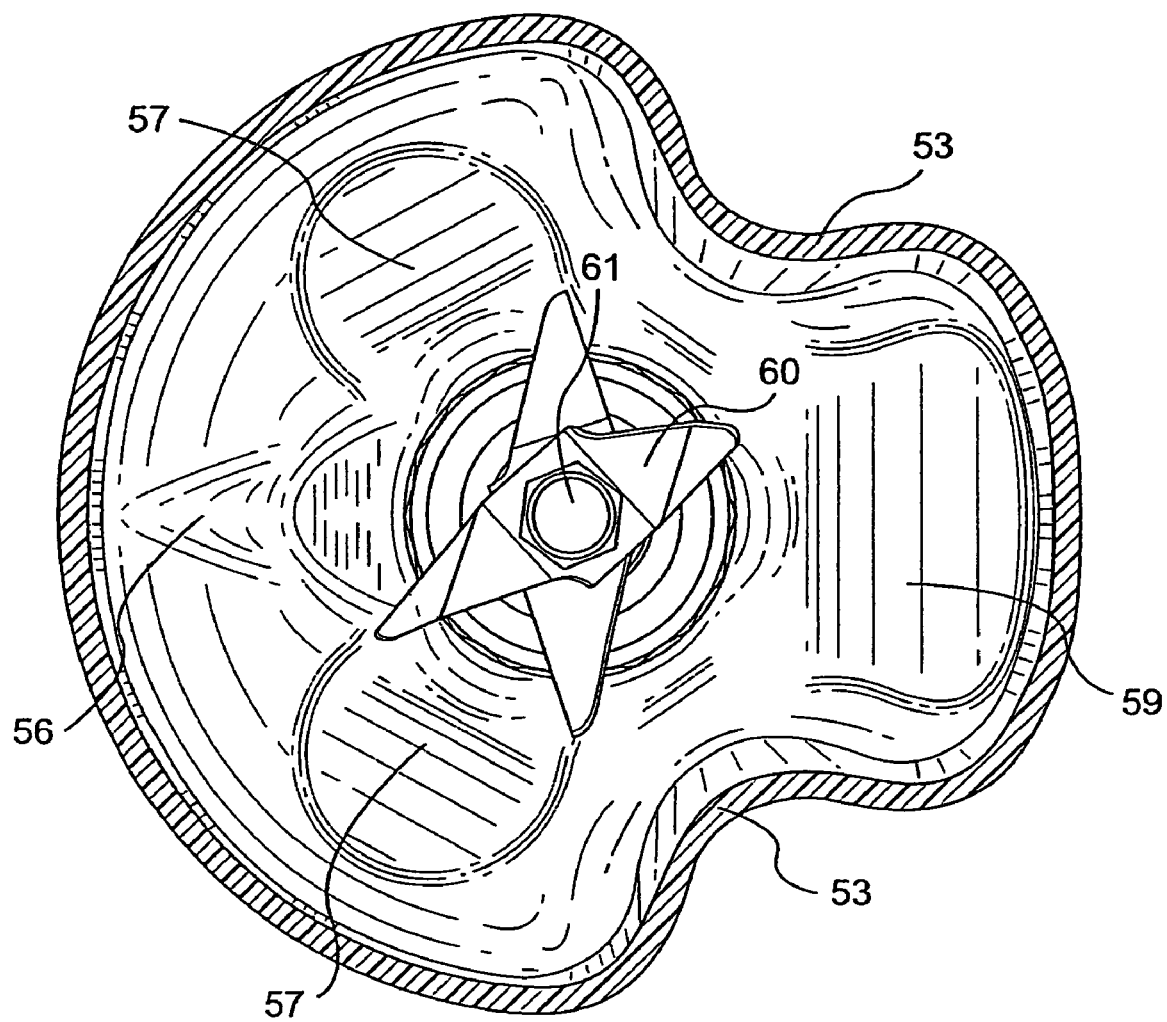
FIG. 8 is a top plan view of the floor of the blender jar as shown in FIG. 5 taken along lines 8 of FIG. 5.
Figure 9:
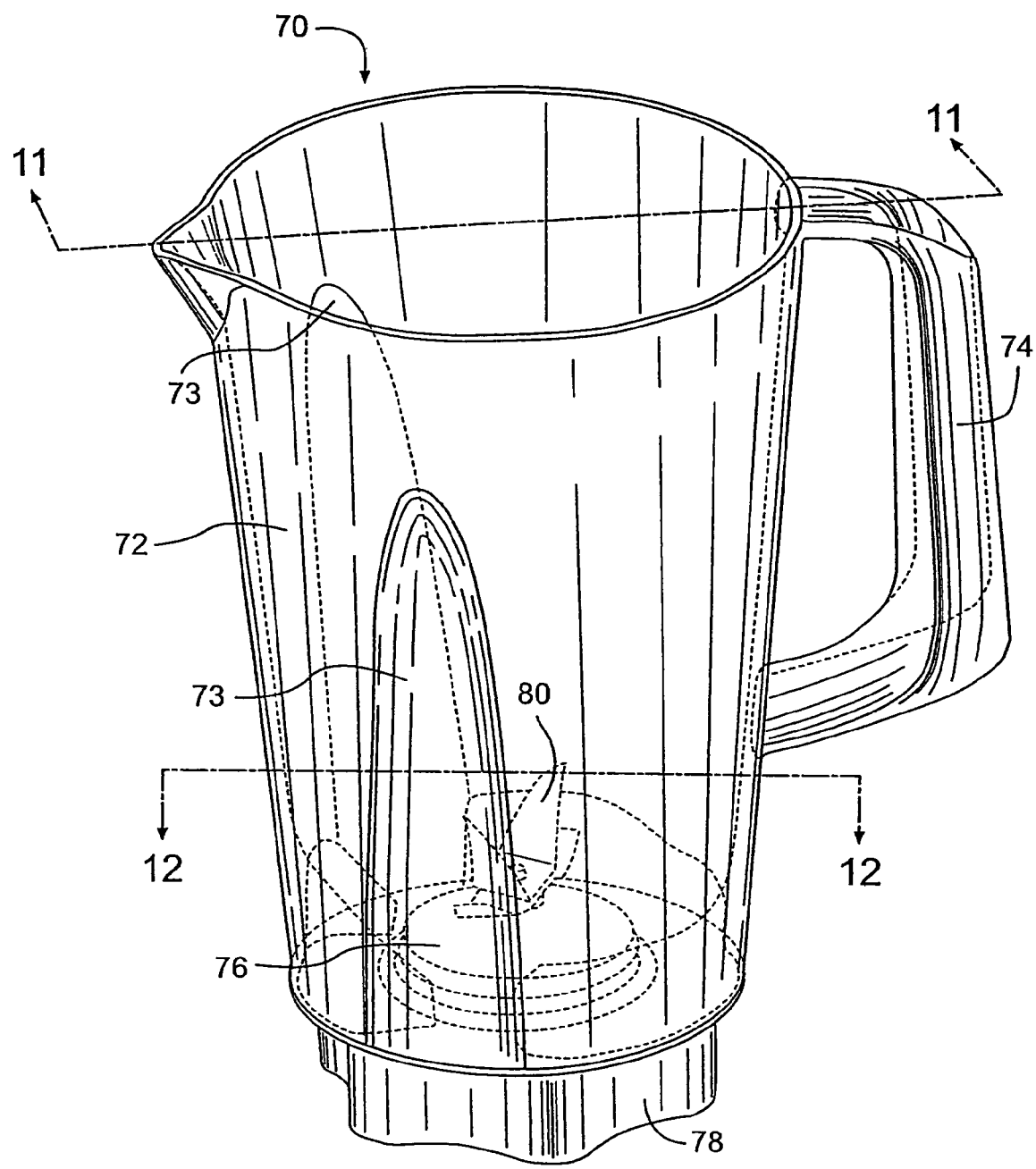
FIG. 9 is a perspective view of a third example of a blender jar in accordance with the present invention.
Figure 10:
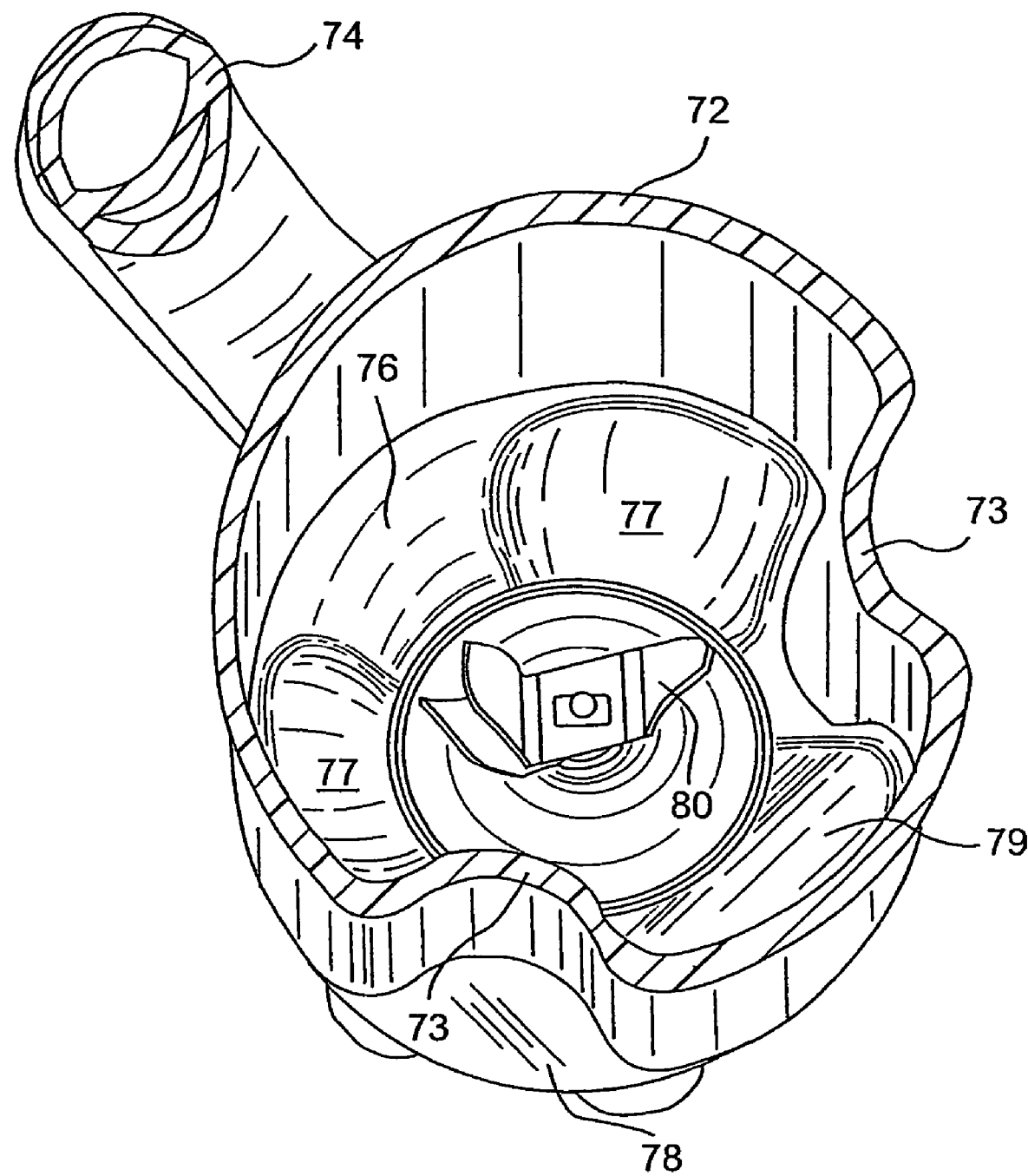
FIG. 10 is a cut away view showing the bottom of the jar shown in FIG. 1.
Figure 11:
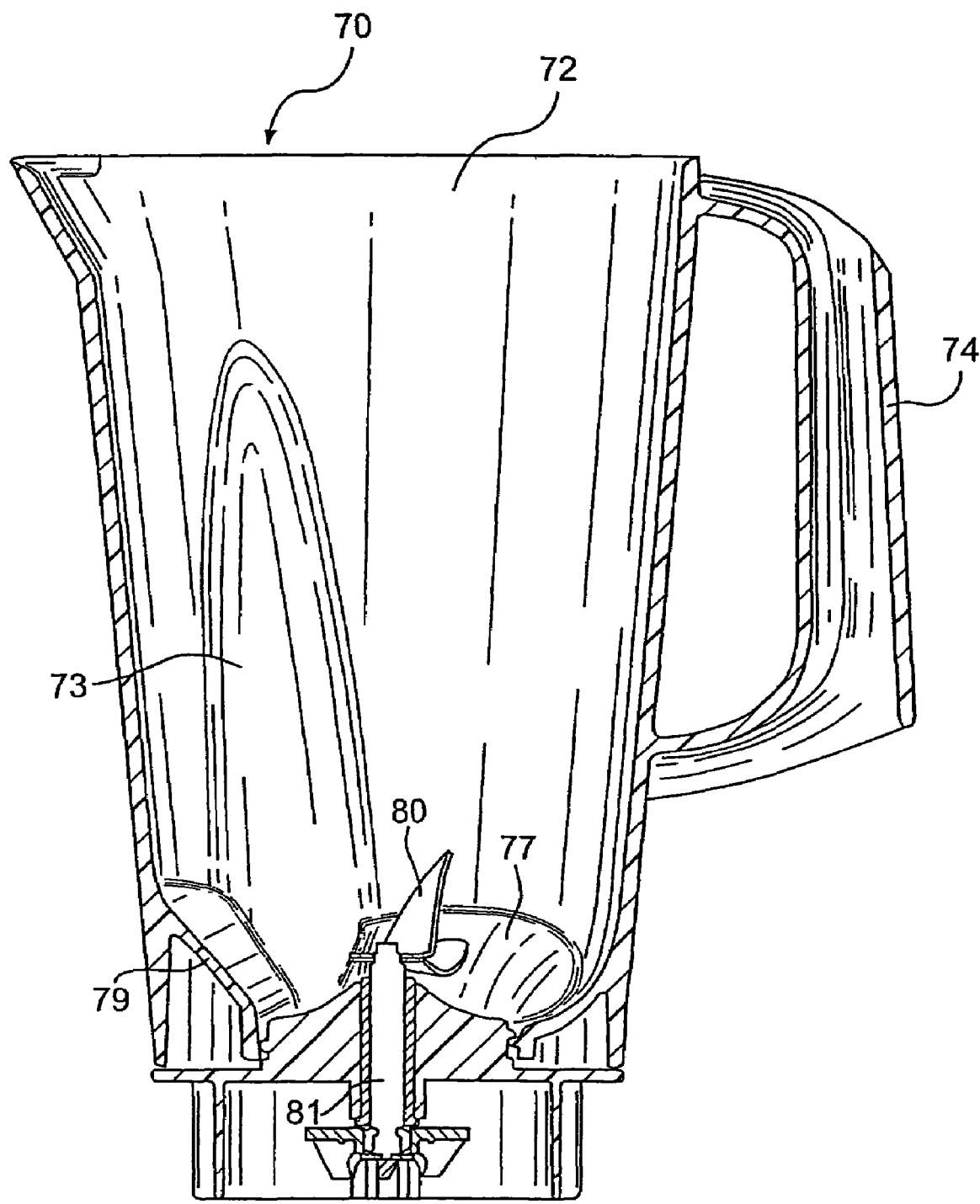
FIG. 11 is a side elevation cross sectional view of the blender jar as shown in FIG. 9 taken along line 11-11 of FIG. 9.
Figure 12:
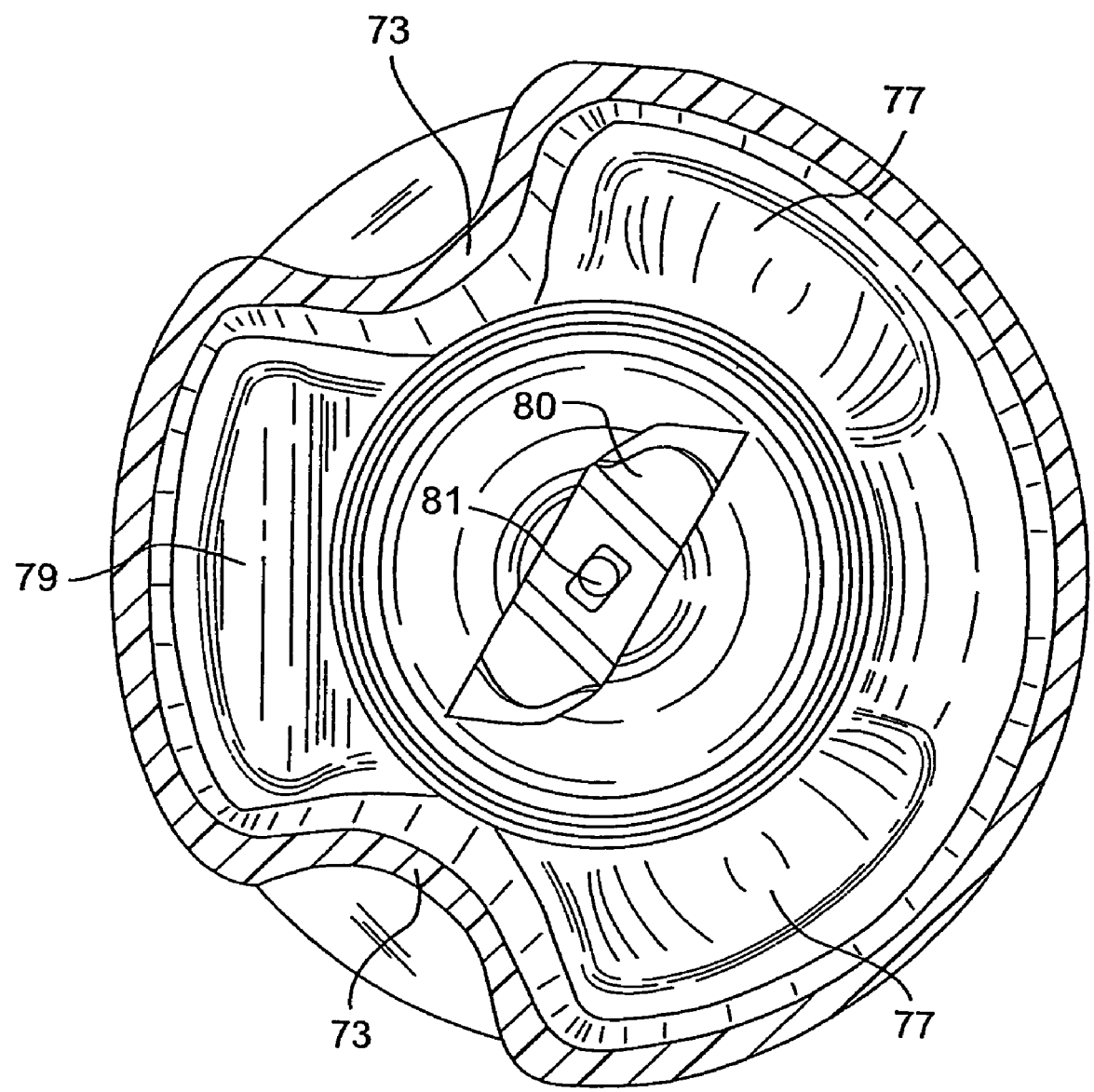
FIG. 12 is a top plan view of the blender jar as shown in FIG. 9 taken along line 12-12 of FIG. 9.

Summary—The performance improvement gained with the jar geometry described in FIG. 3 is quantitatively very substantial. This performance enhancement also contributes to greatly improved blending efficiency.

EXAMPLE 4

FIG. 13

Figure 13:
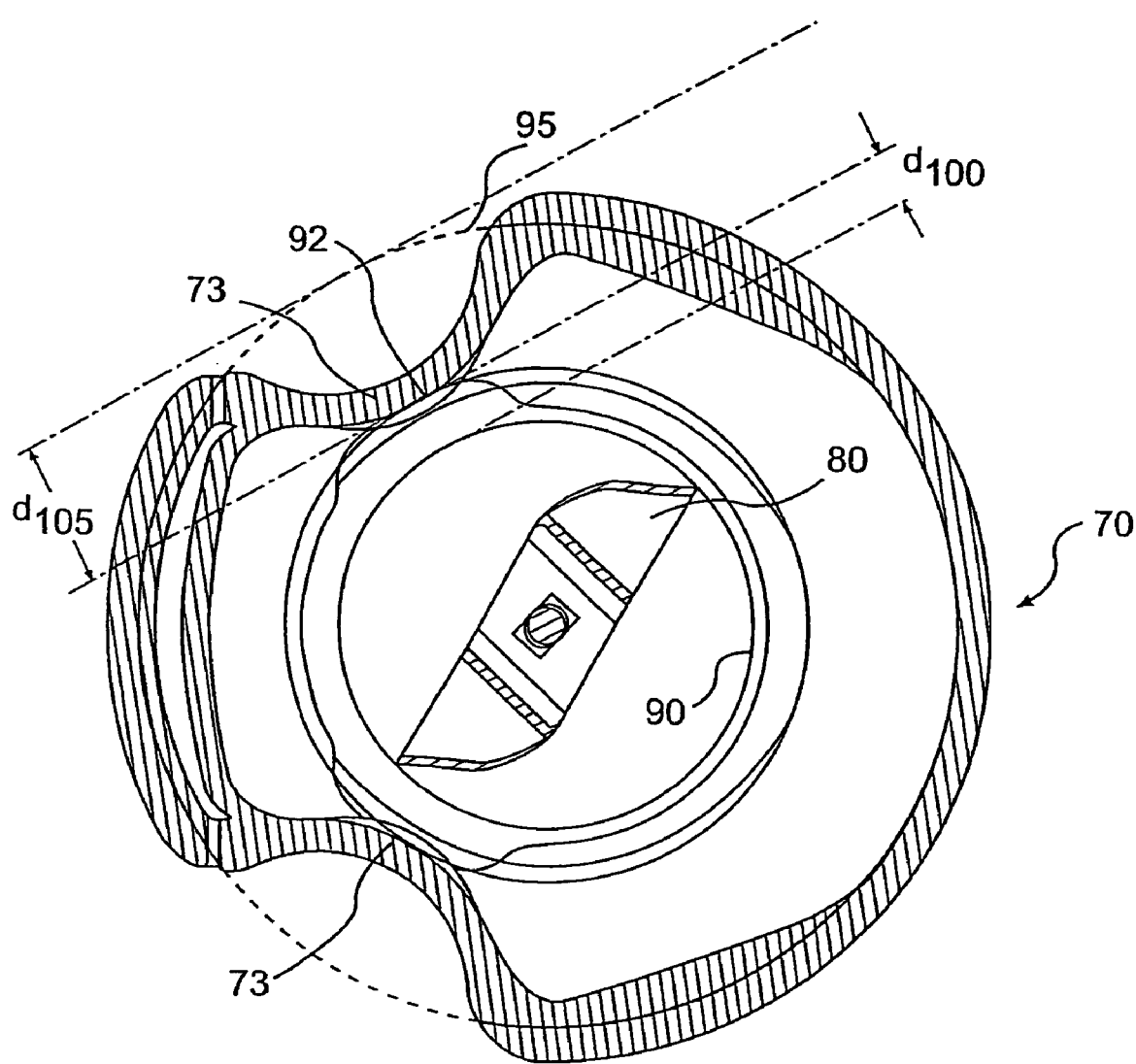
FIG. 13 is a top plan view of the blender jar of FIG. 9 showing the cross-section of the jar in the same plane as the widest point of the blade tip path.

Jar 70 is the same as that shown in FIGS. 9-12, however the cross-sectional view is taken along the jar in the same plane as the blade tip path. FIG. 13 highlights the geometry of the sidewall bumps 73 versus the widest point of the blade path 90. It has been found that the size of the bumps, i.e. the distance $d_{105}$ that they are indented from an imaginary circular radius 95, can improve blender efficiency. As shown, broken line 95 is the imaginary line of the blender jar sidewall if the cross section was substantially circular. The indented distance $d_{105}$, also referred to as the size of the bump, is the distance from the imaginary line 95 to the actual, bump inside surface 92. It has been discovered that the minimum distance $d_{100}$ from the widest point of the blade path 90 to the jar wall bump inside surface 92 should be about 25-55% of the indented distance $d_{105}$. In a preferred embodiment, the minimum distance from the widest point of the blade path to the jar wall bump inside surface is about 30-45% of the indented distance. Engineering a jar outside these ranges of distance ratio is not as efficient as a jar having a construction in the cited ratios.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A blender jar for promoting three dimensional material flow, the jar comprising:

a floor and a sidewall connected to the floor and extending vertically upwardly from the floor to form a space inside the sidewall and above the floor where material is blended;

the floor comprises a central opening through which extends a drive shaft;

a cutter assembly attached to the drive shaft, the cutter assembly comprising a blade that rotates on the shaft inside the blender jar and above the floor, the rotation of the blade defining a blade path;

wherein the floor comprises an agitator that is closer to the blade path than the remainder of the floor; and wherein the agitator is curved in a vertical direction relative to the horizontal plane of the blade path.

2. A blender jar as described in claim 1, wherein the floor comprises a plurality of agitators.

3. A blender jar as described in claim 2, wherein the agitators are symmetrically spaced around the circumference of the opening in the floor.

4. A blender jar as described in claim 2, wherein the agitators are asymmetrically spaced around the circumference of the opening in the floor.

5. A blender jar as described in claim 2, wherein the plurality of agitators comprise a plurality of sizes.

6. A blender jar as described in claim 1, wherein the sidewall comprises a rib.

7. A blender jar as described in claim 1, wherein the sidewall comprises a plurality of ribs.

8. A blender jar as described in claim 1, wherein the sidewall comprises a bump.

9. A blender jar as described in claim 1, wherein the sidewall comprises a plurality of bumps.

10. A blender jar for promoting three dimensional material flow, the jar comprising:

a floor and a sidewall connected to the floor and extending vertically upwardly from the floor to form a space inside the sidewall and above the floor where material is blended;

the floor comprises a central opening through which extends a drive shaft;

a cutter assembly attached to the drive shaft, the cutter assembly comprising a blade that rotates on the shaft inside the blender jar and above the floor, the rotation of the blade defining a blade path; and wherein the floor comprises an agitator that is closer to the blade path than the remainder of the floor, and the side elevation cross-sectional agitator geometry is selected from the group consisting of hemispheric, sinusoidal, curved or a combination thereof.

11. A blender jar as described in claim 10, wherein the floor comprises a plurality of agitators.

12. A blender jar as described in claim 11, wherein the agitators are symmetrically spaced around the circumference of the opening in the floor.

13. A blender jar as described in claim 11, wherein the agitators are asymmetrically spaced around the circumference of the opening in the floor.

14. A blender jar as described in claim 11, wherein the plurality of agitators comprise a plurality of sizes.

15. A blender jar described in claim 10, wherein the sidewall comprises a rib.

16. A blender jar described in claim 10, wherein the sidewall comprises a plurality of ribs.

17. A blender jar a described in claim 10, wherein the sidewall comprises a bump.

18. A blender jar described in claim 10, wherein the sidewall comprises a plurality of bumps.

* * * * *